Nov. 29, 1932.  H. V. REED  1,889,698
FRICTION CLUTCH
Filed April 8, 1931   3 Sheets-Sheet 1

Inventor:
Harold V. Reed
By Wm. O. Belt
Atty.

Nov. 29, 1932.　　　H. V. REED　　　1,889,698
FRICTION CLUTCH
Filed April 8, 1931　　3 Sheets-Sheet 2
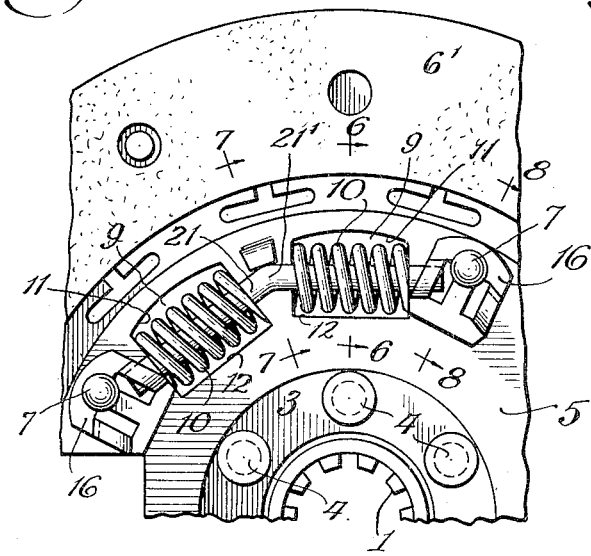
Fig. 4.
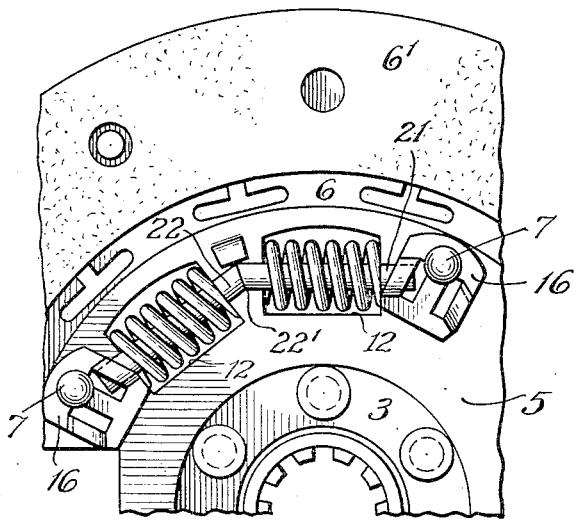
Fig. 5.
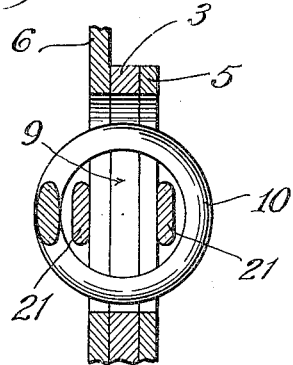
Fig. 6.
Fig. 7.
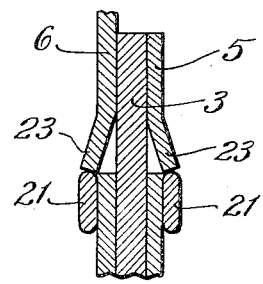
Fig. 8.
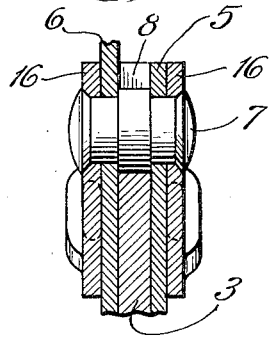
Inventor:
Harold V. Reed
By Wm. O. Bell
Atty.

Nov. 29, 1932.   H. V. REED   1,889,698
FRICTION CLUTCH
Filed April 8, 1931   3 Sheets-Sheet 3
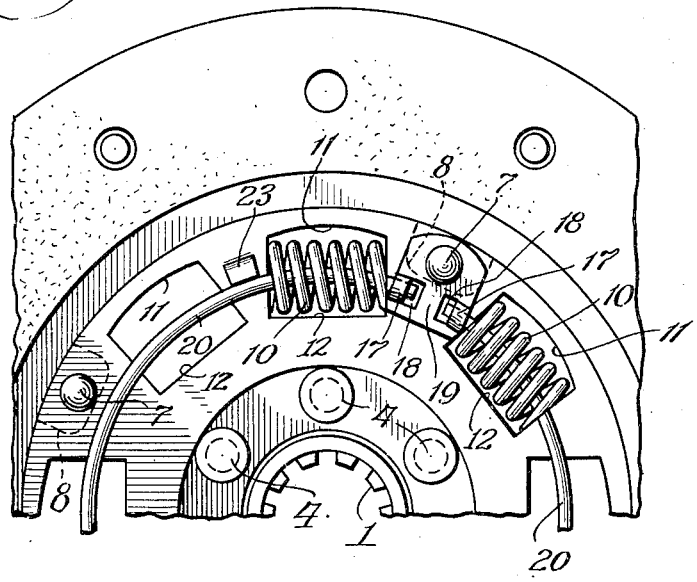
Fig. 9.
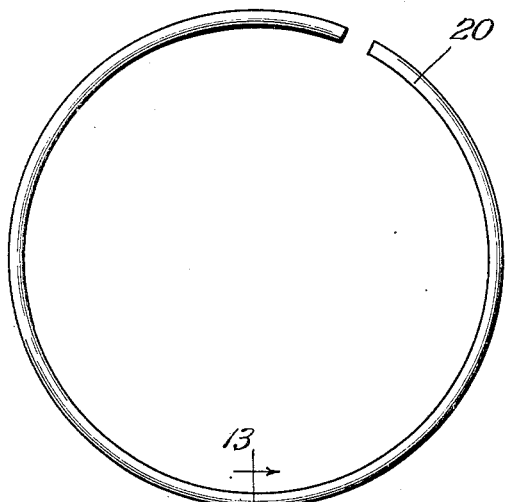
Fig. 10.
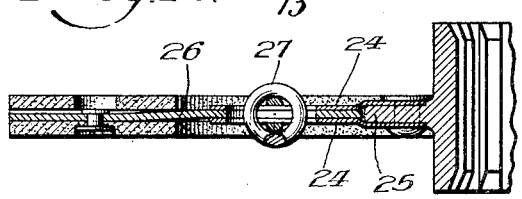
Fig. 17.
Fig. 11.
Fig. 12.
Fig. 13.
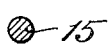
Fig. 14.
Fig. 15.
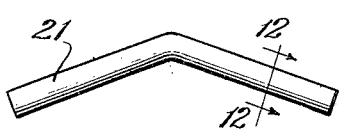
Fig. 16.
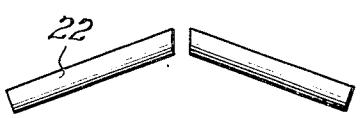
Inventor:
Harold V. Reed
By Wm O. Bell,
Atty.

Patented Nov. 29, 1932

1,889,698

UNITED STATES PATENT OFFICE

HAROLD V. REED, OF CHICAGO, ILLINOIS, ASSIGNOR TO THE BORG & BECK COMPANY, OF CHICAGO, ILLINOIS, A CORPORATION OF ILLINOIS

FRICTION CLUTCH

Application filed April 8, 1931. Serial No. 528,520.

This invention relates to clutch plates of the kind which are gripped or clamped between two parts of a driving member of a friction clutch under sufficient pressure to impart motion from the driving member to the driven member of the clutch, and are provided with spring cushions between said parts to absorb and to prevent the transmission of vibrations from the engine through the clutch.

The object to the invention is to provide simple and novel means for mounting and retaining the springs securely in position in the clutch plate, and to enable the use of larger springs than has been possible heretofore and still provide the necessary axial clearance for the plate.

Another object is to facilitate the installation and replacement of springs in the clutch plate by providing simple means which can be easily applied for retaining the springs in place.

And a further object of the invention is to provide retaining means for the springs which allow ample clearance for the action of the springs and prevent wear thereon.

In the accompanying drawings illustrating a selected embodiment of the invention Fig. 1 is a side elevation of the clutch plate partly broken away and in section.

Figs. 4 and 5 are fragmentary views of the clutch plate showing different forms of retainer devices.

Figs. 6, 7 and 8 are detail sectional views on the lines 6—6, 7—7 and 8—8 respectively of Fig. 4.

Fig. 9 is a fragmentary view showing another embodiment of the invention.

Fig. 10 illustrates a divided ring retainer.

Figs. 11, 12 and 13 are detail sectional views on the lines 11—11, 12—12 and 13—13 of Figs. 14, 15 and 16.

Figs. 14, 15 and 16 are detail views of different types of retainers.

Fig. 17 is a sectional view showing another form of the invention.

Figure 1:
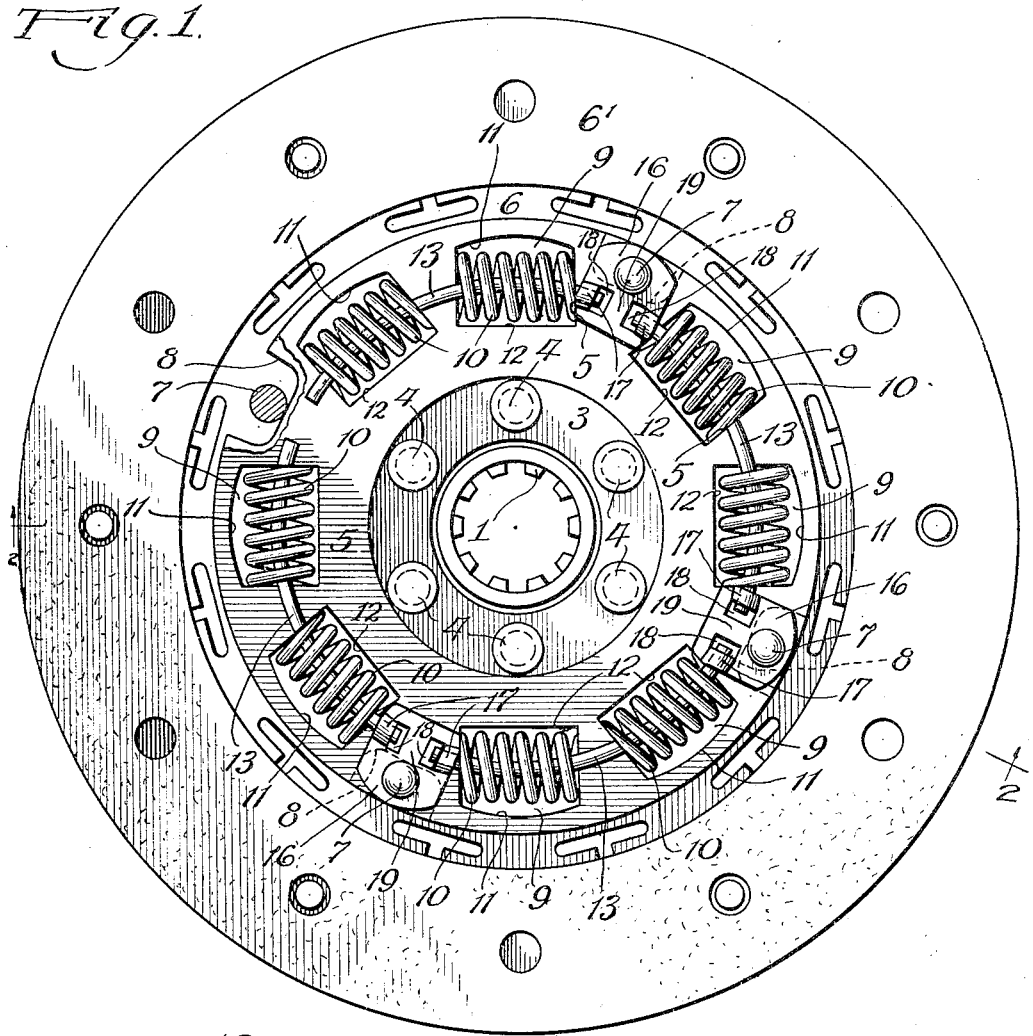
Figure 2:
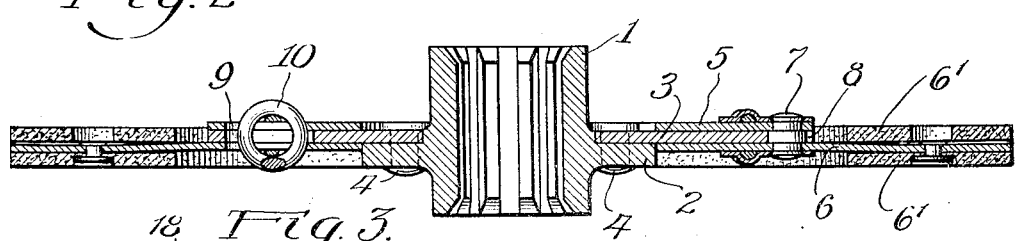
Fig. 2 is a sectional view on the line 2—2 of Fig. 1.
Figure 3:
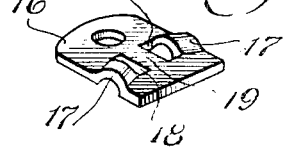
Fig. 3 is a detail perspective view of a clip.

Referring to the drawings, 1 is the hub member which is provided with a small annular flange 2 to which a flange ring 3 is secured by rivets 4. A side plate 5 is arranged at one side of the flange ring 3 and a driven disk 6 is arranged at the other side of the flange ring and carries the usual friction rings or facings 6', and the plate and disk are rigidly secured together by rivets 7 which pass through recesses or openings 8 in the flange ring so that the driven disk and the side plate, which are riveted together, may move annularly relative to the plate ring which is a rigid part of the hub. The plate ring 3, the side plate 5 and the driven disk 6 are provided with registered openings 9 to receive the coil springs 10 which fit snugly therein, the ends of the springs abutting the end walls of the openings. These springs project laterally beyond the side plate 5 and the driven disk 6 and they clear the side walls of the openings. When the clutch plate is revolving at a high rate of speed and the springs are compressed, the tendency is for the springs to bulge outwardly between their ends and I make the outer side wall 11 of the openings curved to accommodate this bulging. The inner side wall 12 may, however, be straight. The springs provide a cushion through which the power is transmitted from the driven disk 6 to the hub member 1 and it is important that these springs be securely retained in place and that the retaining means be of simple character which will permit the springs to be easily installed and replaced. If the springs are not securely retained on the clutch plate they will pop out under compression and destroy the efficiency of the plate. And if springs break and the parts fall away from the clutch plate they, as well as unbroken springs, are liable to interfere with the proper operation of the clutch and cause damage. I have provided a simple retaining means which will enable the springs to be easily installed and replaced and which will securely hold them in place on the clutch plate and without imparting wear thereto. The retainers may be in the form of curved half-round wires 13, Fig. 11, or flat wires 14, Fig. 12, or round wires 15, Fig. 13. These sections indicate the preferred retainer wire shapes but other shapes may be used if desired. One retainer wire is passed through two adjacent springs on one side of the clutch plate and another retainer wire is passed through the same springs on the other side of the plate. These wires fit snugly between the side plate, the driven disk and the springs and will retain the springs against displacement under all conditions. In the assembly shown in Fig. 1, I provide eight springs and four retainer wires on each side, one wire on each side for each pair of springs. To hold the retainer wires against endwise movement, I provide clips 16, Figs. 1, 3, which are secured in place by the rivets 7 and are provided with keepers 17 to receive the ends of the wires. These keepers are formed by upsetting the metal of the clips at opposite sides thereof and adjacent the inner ends of the keepers the clip is cut out at 18 and between these cutouts there is an integral bar 19 which constitutes a stop between the keepers against which the ends of the retainers will abut. Thus the bars 19 will effectually prevent the retainer wires from creeping in the general direction of their length. The retainer wires are of sufficient length so that there will be no possibility of them moving lengthwise between the stops 19 sufficiently to release an end of a cross bar from its keeper. The flat side of the half-round retainer wires is arranged against the side plate and the driven disk and the round side of the retainer wires will engage the springs. It is not necessary that there should be a tight fit of the retainer wires between the side plate, driven disk and springs but I prefer that the fit should be neat to prevent sidewise play of the springs. I prefer to provide a pair of retainers for each pair of springs but there may be separate retainers for each spring or the retainers may hold more than two springs. In Fig. 10, I have shown a divided ring retainer 20 which may be used for all the springs. As before stated, the retainers will hold the springs without the clips so long as the retainers are properly located in the springs. The divided ring retainer 20 requires only a single clip, if any clip is used, to prevent creeping. I prefer to use curved retainers 13 because I find they facilitate the work of installing the springs and are easily secured in place, but I may use angle retainers 21, Fig. 15, or straight bar retainers 22, Fig. 16. I have shown the angle retainer in the clutch plate assembly, Fig. 4, and the straight bar retainer in the clutch plate assembly, Fig. 5, and for both of these retainer types it is desirable to provide the lugs 23 which are struck up from the side plate 5 and the driven disk 6 and form abutments which are engaged by the angles 21' of the angle bars or by the abutting ends 22' of the straight bars 22. The openings in the clips are advantageous because they show that the ends of the retainer properly extend beyond the keepers and are otherwise properly in place, but except for this they may be omitted. As before stated, the tendency is for the springs to bulge outward between their ends under compression and when the clutch plate is revolving at a high rate of speed and for this reason I prefer that the retainer wires should be curved within the springs instead of straight, because curved wires will allow for more bulging action of the springs and ensure clearance between the retainers and the springs when the clutch plate is in operation. Thus the curved outer side wall of the openings allows for outside clearance for the springs and the curved retainers allow for inside clearance when the springs bulge. These retainers are held in fixed position so that after the springs are highly compressed and released the ends of the springs will be forced to resume their original position against the end walls of the openings if they have moved out of the original position under compression.

In Fig. 17 I have shown two side plates 24 riveted to the flange 25 of the hub and a driven disk 26 arranged between the side plates. The springs 27 are located in registered openings in the side plates and driven disk and the retainer wires 28 in the springs overlap the side plates and are held in place thereon by clips 29 like the clips 16.

The invention provides a simple means whereby the springs may be installed initially, or replaced, and securely held in the clutch plate under all conditions of use, and also materially reduces the wear of the springs on the plate members. The invention also enables the use of larger springs of greater diameter than has been possible heretofore and still provide sufficient axial clearance for the plate, because the retaining means are within the springs and are not on the outside thereof.

I have shown the invention embodied in several forms in the drawings but I reserve the right to make any changes in the form, construction and arrangement of parts which may be found to be necessary or desirable in adapting the invention to different kinds of clutches or for other purposes and within the scope of the following claims.

I claim:

1. A clutch plate comprising a hub member and a driven disk member having registered openings therein, coil springs arranged in said openings, and means passing through said springs and engaging one of said members on opposite sides thereof for retaining the springs in the openings.

2. A clutch plate comprising a hub member and a driven disk member having registered openings therein, coil springs arranged in said openings, detachable means passing through said springs and engaging one of said members on opposite sides thereof for retaining the springs in the openings, and stop means to prevent said retaining means from creeping lengthwise.

3. A clutch plate comprising a hub member and a driven disk member having registered openings therein, coil springs arranged in said openings, detachable retainer wires passing through said springs and engaging one of said members on opposite sides thereof for retaining the springs in the openings, and means securing said retainer wires against creeping lengthwise.

4. A clutch plate comprising a hub member and a driven disk member having a plurality of registered openings therein, coil springs arranged in said openings, means passing through a plurality of said springs and having its ends overlapping one of said members on opposite sides thereof, and means for securing said retaining means in operative position.

5. A clutch plate comprising a hub member and a driven disk member having registered openings therein, coil springs arranged in said openings in end to end position concentrically of the plate, and curved retainers passing through said springs and engaging said members on opposite sides thereof for retaining the springs in the openings.

6. A clutch plate comprising a hub member and a driven disk member having registered openings therein, coil springs arranged in said openings, means passing through said springs and engaging one of said members on the side thereof for retaining the springs in the openings, and clips engaging the ends of said retaining means to hold them in operative position.

7. A clutch plate comprising a hub member and a driven disk member having registered openings therein, coil springs arranged in said openings, means passing through said springs and engaging one of said members on opposite sides thereof for retaining the springs in the openings, clips engaging the ends of said retaining means, and stops on said clips to prevent the retaining means from creeping lengthwise.

8. A clutch plate comprising a hub member and a driven disk member having registered openings therein, coil springs arranged in said openings, half-round retainer wires passing through said springs and engaging said members on opposite sides thereof for retaining the springs in the openings.

9. A clutch plate comprising a hub member and a driven disk member having registered openings therein, coil springs arranged in said openings, and flat retainer wires passing through said springs and engaging said members on opposite sides thereof for retaining the springs in the openings.

10. A clutch plate comprising a hub member and a driven disk member having registered openings therein, coil springs arranged in said openings, and curved half-round retainer wires passing through said springs and engaging said members on opposite sides thereof for retaining the springs in the openings.

11. A clutch plate comprising a hub member and a driven disk member having registered openings therein, coil springs arranged in said openings, and angle retainers passing through said springs and engaging said members on opposite sides thereof for retaining the springs in the openings.

12. A clutch plate comprising a hub member and a driven disk member having registered openings therein, coil springs arranged in said openings, angle retainers passing through said springs and engaging said members on opposite sides thereof for retaining the springs in the openings, and abutments on one of said members to be engaged by the angle of said retainers.

13. A clutch plate comprising a hub member and a driven disk member having registered openings therein, coil springs arranged in said openings, and straight retainer wires passing through said springs and engaging said members on opposite sides thereof for retaining the springs in the openings.

14. A clutch plate comprising a hub member and a driven disk member having registered openings therein, coil springs arranged in said openings, abutments on one of said members, straight retainer wires passing through said springs and engaging said members on opposite sides thereof for retaining the springs in the openings, adjacent ends of said wires abutting each other and said abutments, and means securing the other ends of the wires to hold the wires in operative position.

15. A clutch plate comprising a hub member and a driven disk member having registered openings spaced apart therein, coil springs arranged in said openings, retainers passing through one or more of said springs on both sides of and overlapping one of said members, and means securing said retainers in operative position.

16. A clutch plate comprising a hub member and a driven disk member having registered openings spaced apart therein, coil springs arranged in said openings, retainers passing through one or more of said springs on both sides of one of said members and with its ends overlapping said member, and means securing said retainers in operative position.

17. A clutch plate comprising a hub member and a driven disk member having registered openings spaced apart therein, coil springs arranged in said openings, detachable means interposed between the springs and one of said members and passing through the springs on both sides of said member for retaining the springs in said member, and means securing said retaining means in operative position.

18. A clutch plate comprising a hub member and a driven disk member having registered openings spaced apart therein, coil springs arranged in said openings, means passing through said springs and interposed between the springs and the sides of one of said members for retaining the springs on said member, and means securing said retaining means in operative position.

19. A clutch plate comprising a hub member and a driven disk member having registered openings spaced apart therein, coil springs arranged in said openings, detachable means passing through said springs and overlapping the driven disk member for retaining the springs on said member, and means securing said retaining means in operative position.

HAROLD V. REED.